US012665451B2

(12) United States Patent
Kuehbacher et al.

(10) Patent No.: US 12,665,451 B2
(45) Date of Patent: Jun. 23, 2026

(54) STATOR OF AN ELECTRIC MACHINE

(71) Applicant: Robert Bosch GmbH, Stuttgart (DE)

(72) Inventors: Daniel Kuehbacher, Stuttgart (DE);
Felix Bensing, Stuttgart (DE); **Jannik
Stammler**, Stuttgart (DE)

(73) Assignee: Robert Bosch GmbH, Stuttgart (DE)

( * ) Notice: Subject to any disclaimer, the term of this
patent is extended or adjusted under 35
U.S.C. 154(b) by 192 days.

(21) Appl. No.: 18/291,007

(22) PCT Filed: Jun. 8, 2022

(86) PCT No.: PCT/EP2022/065453
§ 371 (c)(1),
(2) Date: Jan. 22, 2024

(87) PCT Pub. No.: WO2023/001445
PCT Pub. Date: Jan. 26, 2023

(65) Prior Publication Data
US 2025/0167603 A1      May 22, 2025

(30) Foreign Application Priority Data
Jul. 23, 2021    (DE) ..................... 10 2021 207 922.9

(51) Int. Cl.
*H02K 1/20*          (2006.01)
*H02K 1/16*          (2006.01)
(Continued)

(52) U.S. Cl.
CPC .............. *H02K 1/20* (2013.01); *H02K 1/165*
(2013.01); *H02K 3/12* (2013.01)

(58) Field of Classification Search
CPC .. H02K 1/20; H02K 3/24; H02K 9/19; H02K
9/193; H02K 9/197; H02K 1/146;
(Continued)

(56) References Cited

U.S. PATENT DOCUMENTS

| | | | |
|---|---|---|---|
| 3,119,033 A | 1/1964 | Horsley et al. | |
| 4,323,802 A * | 4/1982 | Leistner ................... | H02K 1/32 |
| | | | 310/59 |

(Continued)

FOREIGN PATENT DOCUMENTS

| | | |
|---|---|---|
| CN | 102420468 B | 11/2017 |
| DE | 102019113785 A1 | 11/2020 |

(Continued)

OTHER PUBLICATIONS

Translation of International Search Report for Application No.
PCT/EP2022/065453 dated Oct. 14, 2022 (2 pages).

(Continued)

*Primary Examiner* — Michael Andrews
(74) *Attorney, Agent, or Firm* — Michael Best &
Friedrich LLP

(57)          ABSTRACT

The invention relates to a stator of an electric machine,
comprising a laminated core (3) on which stator teeth (4) and
stator grooves (5) are formed. The stator teeth (4) are
connected via a stator yoke (7), and a conductor (9) or a
conductor bundle (10) comprising a plurality of conductors
(9) is arranged in each stator groove (5) in order to form a
stator winding (8), wherein each of the stator grooves (5) has
a groove base (5.1) and a groove slot (5.2). Each stator
groove (5) is equipped with a plurality of connection points
(11) for supporting the conductor (9) or conductor bundle
(10) lying in the respective stator groove (5). At least one
groove gap that forms a groove gap channel (14) through
which a coolant can flow along a cooling path (15) is formed
between the walls of each stator groove (5) and the respec-
tive conductor (9) or conductor bundle (10), and each groove
gap channel (14) is at least constricted at the connection
points (11), wherein
   the groove slot (5.2) of each stator groove (5) is closed by
     a groove closure (16),
(Continued)

a respective bypass (18) is provided in each stator groove (5) at each of the support points (11) in order to conduct the coolant past the constricted support point (11) in the groove gap channel (14), and the bypasses (18) at the different support points (11) of the same stator groove (5) are arranged at different radial positions such that a meandering cooling path (15) is formed in the stator groove (5).

13 Claims, 4 Drawing Sheets

(51) Int. Cl.
    *H02K 3/12*      (2006.01)
    *H02K 9/197*    (2006.01)

(58) Field of Classification Search
    CPC   H02K 1/165; H02K 3/12; H02K 3/48; H02K 3/487
    USPC ...................................................... 310/59, 214
    See application file for complete search history.

(56)             References Cited

U.S. PATENT DOCUMENTS

| | | | |
|---|---|---|---|
| 4,994,700 | A | 2/1991 | Bansal et al. |
| 2011/0133580 | A1 | 6/2011 | Sugimoto et al. |
| 2012/0074708 | A1 | 3/2012 | Le Besnerais |
| 2018/0351434 | A1* | 12/2018 | Knoblauch .............. H02K 1/32 |
| 2019/0363601 | A1 | 11/2019 | Kneidl et al. |
| 2020/0156296 | A1* | 5/2020 | E Silva .................. H02K 9/197 |
| 2020/0373803 | A1* | 11/2020 | Stoll ........................ H02K 3/28 |
| 2022/0014062 | A1* | 1/2022 | Almeida E Silva ... H02K 9/227 |
| 2022/0311297 | A1* | 9/2022 | Hinrich .................... H02K 3/24 |
| 2023/0013487 | A1 | 1/2023 | Grimm et al. |
| 2024/0213839 | A1 | 6/2024 | Vogt et al. |
| 2024/0258857 | A1 | 8/2024 | Kuehbacher et al. |
| 2024/0258858 | A1 | 8/2024 | Kuehbacher et al. |
| 2025/0088048 | A1 | 3/2025 | Kronsteiner et al. |

FOREIGN PATENT DOCUMENTS

| | | | |
|---|---|---|---|
| EP | 2693608 | A1 | 2/2014 |
| FR | 3093388 | A1 | 9/2020 |
| JP | S52124039 | U | 9/1977 |
| JP | S5449520 | U | 4/1979 |
| JP | S55133640 | A | 10/1980 |
| JP | S58127833 | U | 8/1983 |
| JP | 2001145302 | A | 5/2001 |
| JP | 2012100433 | A | 5/2012 |
| JP | 2014197962 | A | 10/2014 |
| JP | 2015033226 | A | 2/2015 |
| JP | 2018164374 | A | 10/2018 |
| JP | 2020089261 | A | 6/2020 |
| JP | 2020524469 | A | 8/2020 |

OTHER PUBLICATIONS

Notice of Allowance issued by the U.S. Patent Office for U.S. Appl. No. 18/291,019 dated Oct. 20, 2025 (9 pages).

Non-final Office Action issued by the U.S. Patent Office for U.S. Appl. No. 18/291,025 dated Sep. 25, 2025 (15 pages).

\* cited by examiner

STATOR OF AN ELECTRIC MACHINE

BACKGROUND

The invention proceeds from a stator of an electric machine.

The invention relates to a stator of an electric machine known from DE102019113785 A1, comprising a stator axis and a laminated core on which are formed stator teeth and stator grooves located between the stator teeth, the laminated core having a plurality of laminates, the stator teeth being connected together by an annular stator yoke, a conductor bundle comprising a plurality of conductors being provided in each of the stator grooves in order to form an electrical stator winding, each of the stator grooves having a groove base facing the groove yoke and a groove slot facing away from the groove base, a plurality of support points which are spaced apart from one another in the axial direction with respect to the stator axis being formed in each of the stator grooves in order to support the conductor or conductor bundle in each stator groove, at least one groove gap being formed between the walls of each stator groove and the conductor or conductor bundle arranged in the stator groove, the groove gap forming a groove gap channel extending in the axial direction through which a coolant, in particular oil, can flow along a cooling path, each groove gap channel being at least constricted at the support points. There is no certainty that the respective conductor bundle in the groove gap channel is cooled evenly along the cooling path since, for example, an uneven flow distribution over the flow cross section of the groove gap channel can arise.

SUMMARY

In contrast, the stator of an electric machine according to the invention has the advantage that each conductor bundle in the groove gap channel is cooled more evenly along the cooling path.

According to the present invention, this is achieved by the groove slot of the respective stator groove being closed by a groove closure, a bypass being provided in each stator groove at each of the support points in order to conduct the coolant past the constricted support point in the groove gap channel, and by the bypasses at the different support points of the same stator groove being arranged at different radial positions such that a meandering cooling path is formed in the stator groove.

It is particularly advantageous if each of the bypasses of the different support points of the same stator groove are formed either at the groove base, in particular in the groove base or in the tooth flanks at the groove base, or in the groove closure such that a meandering cooling path is formed in the stator groove. In this way, a meandering cooling path is achieved which meanders widely in the radial direction and thus achieves very uniform cooling in the stator groove.

According to one advantageous exemplary embodiment, the bypasses of the different support points of the same stator groove are formed in the groove base or the groove closure in alternating fashion in order to form the meandering cooling path from one support point to the next support point. Alternatively, the meanders can also be longer when viewed in the axial direction.

It is very advantageous for each bypass to be formed by, e.g., a groove-shaped bypass channel. In this way, the bypass can be manufactured very easily in the respective stator groove of the stator laminated core. If the bypass channel has a channel width that is smaller than a conductor width of the conductor or conductor bundle, then it is advantageously ensured that the conductor or the conductor bundle cannot close or block the bypass channel, e.g., by slipping into the bypass channel.

It is also advantageous if the laminated core comprises a plurality of identical laminates, each individual laminate of the identical laminates comprising a plurality of groove recesses for forming the stator grooves and, relative to an individual laminate of the laminates, a bypass recess is provided at the groove base of specific groove recesses distributed along the periphery according to a specific pattern, the bypass recesses forming the bypass channel. No bypass recesses are formed on the remaining groove recesses of the laminate. In this way, using the same laminate, bypasses can be produced on the groove base of each stator groove at pre-determined axial positions in each stator groove of the laminated core. The production costs of the laminated core are therefore not increased, or not substantially so, despite the additionally-provided bypasses according to the invention.

This can advantageously be achieved by rotating a number of the identical laminates about the stator axis in the laminated core such that the bypasses are formed in the individual stator grooves at the specific axial position and over a specific length.

According to an advantageous exemplary embodiment, the groove closures of the stator grooves can each be formed by a single groove closure element, or be formed integrally, or as a plurality of pieces on a slotted tube.

In addition, it is advantageous if the support points are formed by rotating at least two laminates of the laminated core about the stator axis by a specific angular rotation. In this way, the conductor bundle of each stator groove is clamped between two tooth flanks at each support point. To ensure protection of the electrical insulation on the conductor or conductor bundle, a protective element can be provided in the area of the support point around the conductor bundle as an alternative to commonly provided groove insulating paper. It can thus be possible to at least partially omit the use of impregnating resin as insulation in a groove gap between the laminated core and the conductor bundle.

It is further advantageous if, by rotating the laminates of the laminated core in order to form the respective support points, support sections of the laminates are formed which project from opposite sides of the stator groove into the respective stator groove in order to hold, in particular clamp, the conductor or conductor bundle between the support sections on holding surfaces of the conductor or conductor bundle. In this way, the conductor or the conductor bundle can be supported in the middle or centered in each stator groove in the circumferential direction with respect to the stator axis.

The invention further relates to an electrical machine having a housing in which a stator according to the invention is arranged, the stator winding forming a winding head on each end face of the stator, a winding head cooling chamber accommodating the respective winding head being provided inside the housing on each end face of the stator for cooling the respective winding head, flow through the stator grooves being possible starting from one of the two winding head cooling chambers and proceeding into the other winding head cooling chamber. Particularly effective cooling of the stator can be achieved in this way.

BRIEF DESCRIPTION OF THE DRAWINGS

An exemplary embodiment of the invention is shown in simplified form in the drawings and explained in further detail in the following description.

DETAILED DESCRIPTION

Figure 1:
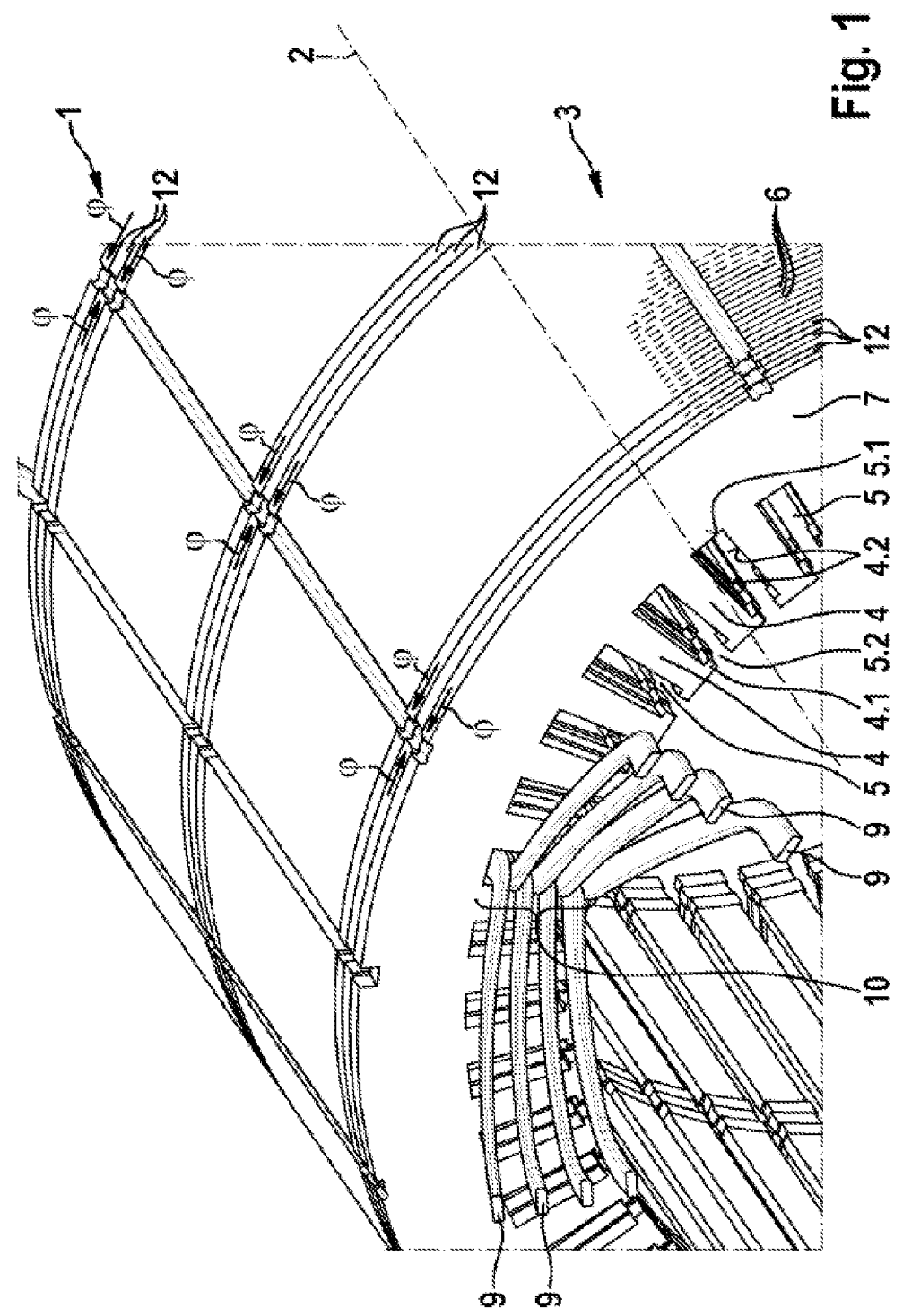
FIG. 1 shows a partial view of a stator of an electric machine according to the invention.

FIG. 1 shows a partial view of a stator of an electric machine according to the invention.

The stator 1 of an electric machine has a stator axis 2 and comprises a laminated core 3 on which stator teeth 4 are formed, with stator grooves 5 lying between the stator teeth 4, said laminated core being formed by a stack of laminates 6.

The stator teeth 4 are connected together by an annular stator yoke 7 of the laminated core 3 and can have a tooth head 4.1. Either a single conductor 9 or a conductor bundle 10 comprising a plurality of conductors 9 can be provided in each of the stator grooves 5 to form an electrical stator winding 8. To illustrate the invention, FIG. 1 shows a conductor bundle 10 in only one of the stator grooves 5.

The conductors 9 of the stator 1 can each be designed as a flat wire conductor, each of which has a square, in particular rectangular, conductor cross-section. Furthermore, the conductors 9 of the stator 1 can each be formed as hairpin or as I-pin conductor elements. The conductors 9 are coated, e.g., with an insulating lacquer, in a known manner.

Figure 2:
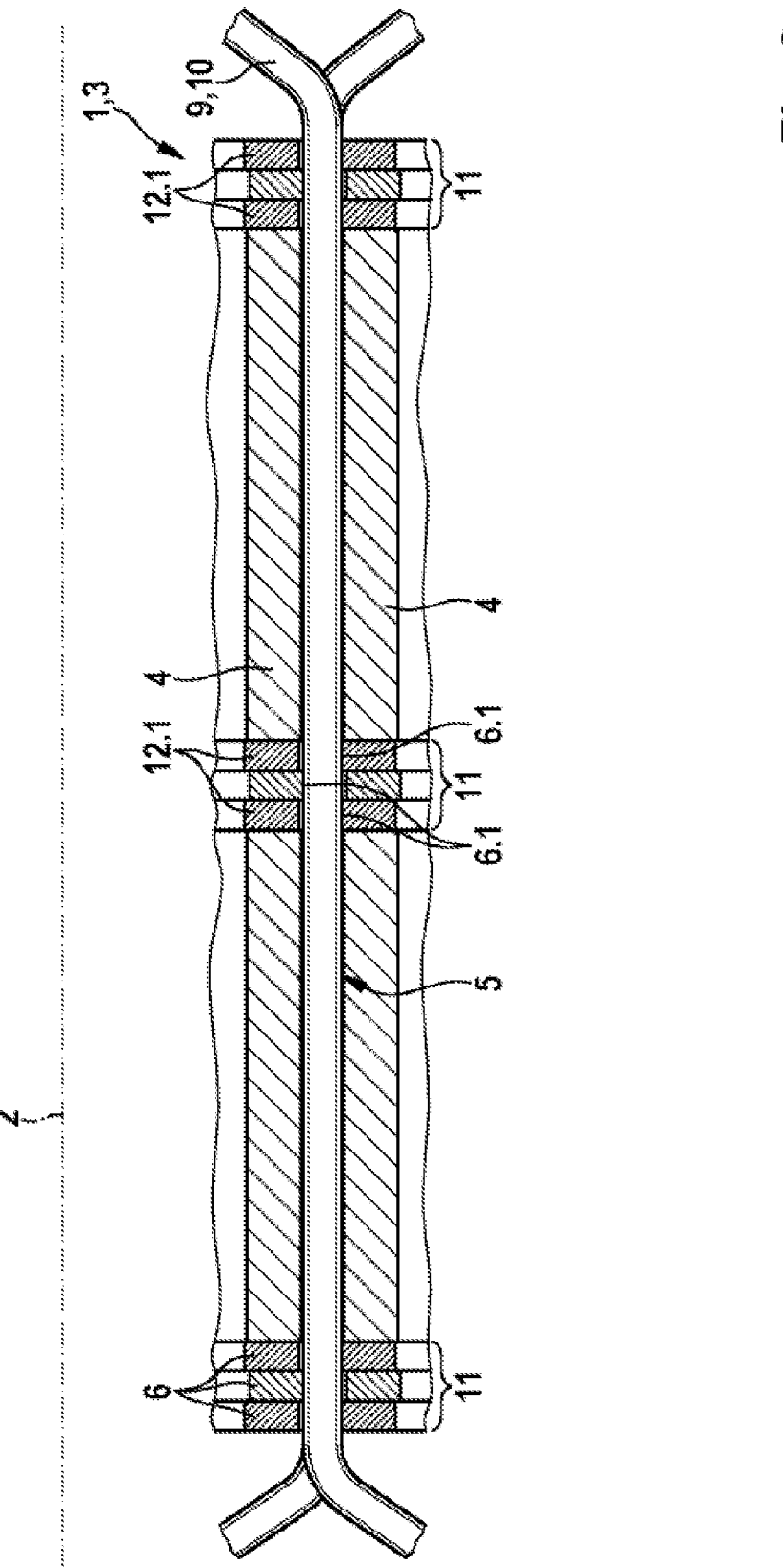
FIG. 2 shows a sectional view of the stator according to FIG. 1 with a conductor bundle mounted in one of the stator grooves at a plurality of support points according to the invention.

FIG. 2 shows a sectional view of the stator according to FIG. 1 with a conductor bundle mounted in one of the stator grooves at a plurality of support points according to the invention.

As shown in FIG. 2, a plurality of, e.g. three, support points 11 distanced from one another in the axial direction with respect to the stator axis 2 are formed in each of the stator grooves 5 for clamping, fixing, or supporting the conductor 9 or conductor bundle 10 located in the respective stator groove 5.

The support points 11 can, e.g., be formed by rotating at least two laminates 6 of the laminated core 3 by a specific angular rotation Φ about the stator axis 2. By rotating the laminates 6 in opposite directions to form the respective support point 11, support sections 6.1 of the laminates 6 are formed which project into each stator groove 5 from opposite sides of the stator groove 5 so as to hold, i.e., clamp, the conductor bundle 10 between the support sections 6.1 at support surfaces 13 of the conductor bundle 10. The rotated laminates 6 are fixed in the laminated core 3 against further rotation, in particular using materially-bonded joints, such that stable and durable support points 11 are formed in the laminated core 3.

The conductor bundle 10 of the respective stator groove 5 is freely suspended, i.e., having no contact with the laminated core 3, between the support points 11 according to the invention. The conductor bundle 10 of the respective stator groove 5 is thus, e.g., in contact with the laminated core 6 only at the support points 11.

A protection layer, which is not shown, can be provided between the conductor bundle 10 of the respective stator groove 5 and the respective support point 11, the protection layer being designed cuff-shaped, sleeve-shaped, tubular, clip-shaped, U-shaped, strip-shaped, or ribbon-shaped in particular.

Figure 3:
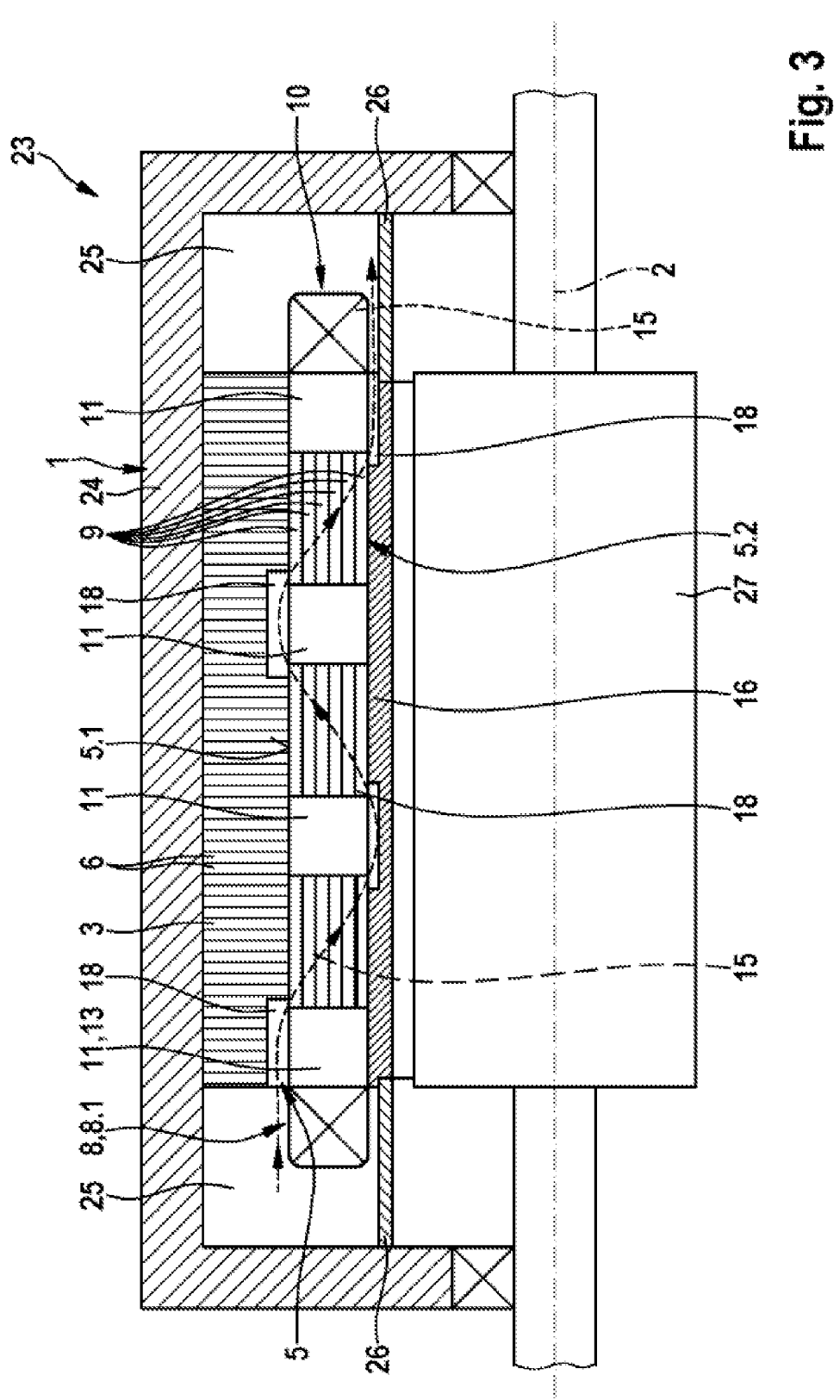
FIG. 3 shows a partial view of an electric machine in a longitudinal section through a stator groove of the stator according to the invention according to FIG. 1 and FIG. 2.

FIG. 3 shows a partial view of an electrical machine having the stator according to the invention, shown in FIG. 1 to FIG. 2 in a longitudinal section.

The stator grooves 5 each have a groove base 5.1 facing the stator yoke 7 and a groove slot 5.2 facing away from the groove base 5.1, the slot being in particular formed between two tooth heads 4.1 of the respective stator teeth 4.

Provided between the walls of each stator groove 5 and the conductor 9 or conductor bundle 10 arranged in the stator groove 5 is at least one groove gap forming a groove gap channel 14 extending in the axial direction through which a coolant, in particular oil, can flow along a cooling path 15.

Each groove gap channel 14 of the stator grooves is constricted at least at the support points 11.

According to the invention, it is provided that the groove slot 5.2 of each stator groove 5 is closed by a groove closure 16 in the radial direction toward what is referred to as an air gap, a bypass 18 being provided in the each stator groove 5 at the support points 11 in order to conduct the coolant past the constricted support point 11 in the groove gap channel 14. In addition, according to the invention the bypasses 18 are arranged at the different support points 11 of the same stator groove 5 at different radial positions relative to the stator axis 2 such that a meandering cooling path 15 is formed in the stator groove 5. The groove closure 16 tightly seals, or at least in a semi-tight manner, the groove gap channel 14 in the radial direction against the air gap.

The meandering cooling path 15 comprises at least one meander that extends, in the flow direction, along a longitudinal extension of the stator groove 5 from the groove base 5.1 along the groove slot 5.2 to the groove base 5.1, or from the groove slot 5.2 along the groove base 5.1 to the groove slot 5.2.

Each of the bypasses 18 of the different support points 11 of the same stator groove 5 are formed either at the groove base 5.1, in particular in the groove base 5.1, or in the tooth flanks 4.2 at the groove base 5.1, or in the groove closure 16 such that a meandering cooling path 15 is formed in the stator groove 5.

According to the exemplary embodiment in FIG. 3, the bypasses 18 of the different support points 11 of the same stator groove 5 are formed in the groove base 5.1 or in the groove closure 16 in alternating fashion from one support point 11 to the next support point 11 as seen in the axial direction in order to form the meandering cooling path 15.

The electric machine 23 has a housing 24, in which the stator 1 according to the invention is arranged. The stator winding 8 forms a winding head 8.1 at each end face of the stator 1. Provided within the housing 24 is a winding head cooling chamber 25 accommodating the respective winding head 8.1 at each end face of the stator 1 for cooling the respective winding head 8.1. Flow through the stator grooves 5 of the stator 1 can in this case start from one of the two winding head cooling chambers 25, along the cooling path 15 of the stator grooves 5 and into the other winding head cooling chamber 25, e.g., in parallel, in series, or a combination of parallel and series. The respective winding head cooling chamber 25 is bordered radially inwards with respect to the stator axis 2 by an annular wall 26, e.g. a sealing sleeve. The sealing sleeve 26 can, e.g., be part of a slotted tube which extends into an air gap formed between the stator 1 and a rotor 27 of the electric machine 23 and project through the gap in the axial direction with respect to the stator axis 2.

The groove closures 16 of the stator grooves 5 can each be formed by a single groove closure member disposed and secured in the respective stator groove 5. Alternatively, the groove closures 16 of the stator grooves 5 can be formed integrally or as a plurality of pieces on what is referred to as a slotted tube arranged in an air gap between the stator 1 and the rotor 27 of the electric machine 23, and can, e.g., be made of fiber-reinforced plastic (CFC, GFRP).

Figure 4:
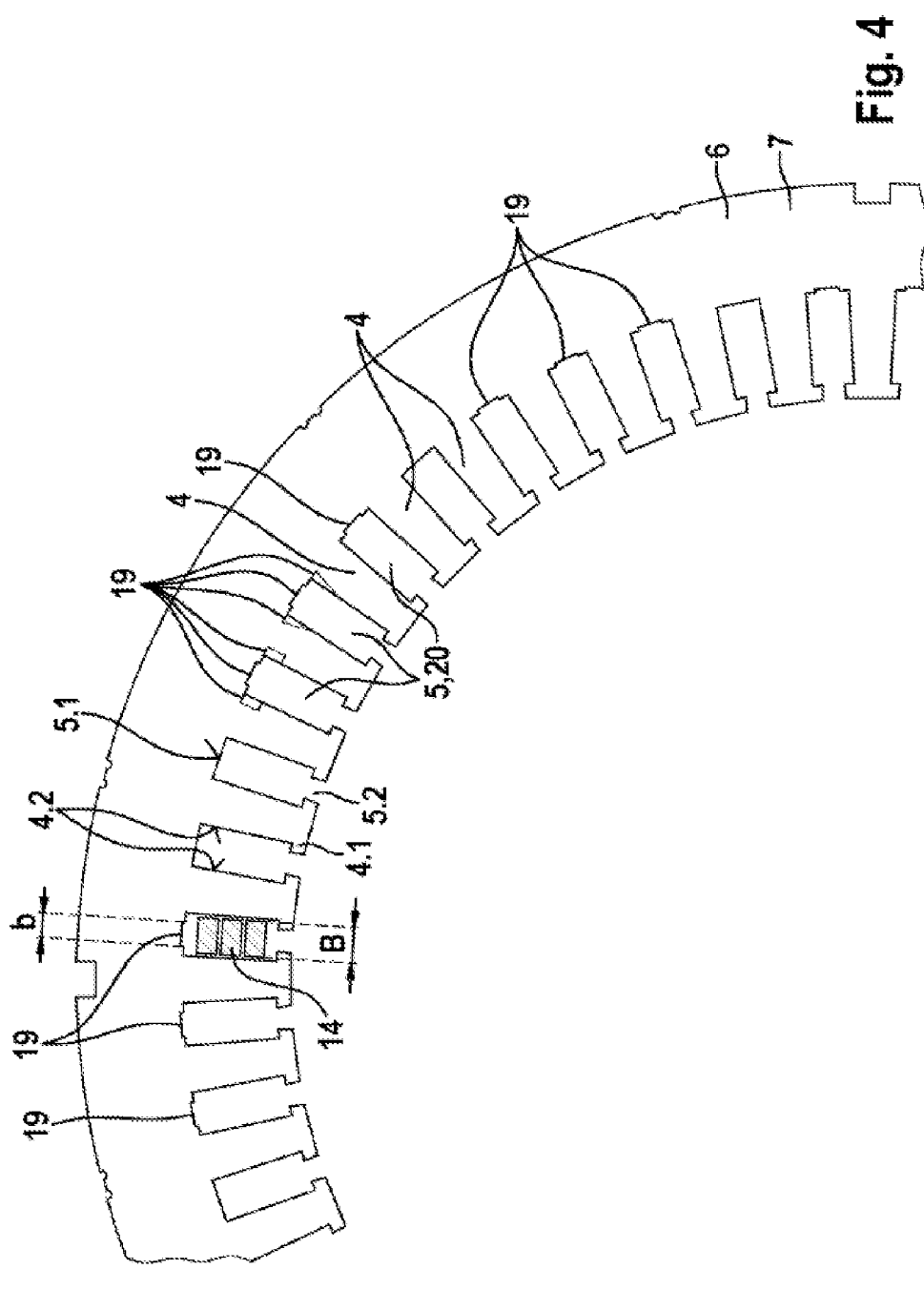
FIG. 4 shows one of the laminates of the stator according to the invention according to FIG. 1 to FIG. 3.

FIG. 4 shows one of the laminates of the stator according to the invention shown in FIG. 1 to FIG. 3.

Each bypass 18 is formed by a bypass channel at the groove base 5.1, in particular in the groove base 5.1 or in the tooth flanks 4.2 (shown dashed in FIG. 4) at or near the groove base 5.1, or in the groove closure 16 of the respective stator groove 5. For example, the bypass channel 18 is grooved and/or has a channel width b that is smaller than a conductor width B of the conductor bundle 10.

Each of the bypasses 18 on the groove base 5.1 is formed in the corresponding laminates 6 of the laminated core 3 of the stator 1.

The laminated core 3 comprises, e.g., a plurality of identical laminates 6, each individual laminate of the identical laminates 6 having a plurality of groove recesses 20 for forming the stator grooves 5. With regard to an individual laminate of the laminates 6, a bypass recess 19 is provided on the groove base 5.1, for example in the groove base 5.1, of specific groove recesses 20 distributed along the periphery of the laminate 6 according to a specific pattern, the bypass recess forming the bypass channel 18, there being no bypass recess 19 formed on the remaining groove recesses 20 of the laminate 6. According to the pattern, therefore, a bypass recess 19 is formed on some of the groove recesses 20 of the laminate 6 and no bypass recess 19 is formed on the remaining groove recesses 20.

By rotating many of the identical laminates 6 in the laminated core 3 about the stator axis 2, each of the bypasses 18 in the individual stator grooves 5 can be formed at the desired axial positions and along a desired length.

The invention claimed is:

1. A stator of an electric machine (23), comprising a stator axis (2) and a laminated core (3) on which stator teeth (4) are formed, with stator grooves (5) lying between the stator teeth (4), said laminated core comprising a plurality of laminates (6), wherein the stator teeth (4) are connected together via an annular stator yoke (7), wherein a single conductor (9) or a conductor bundle (10) comprising a plurality of conductors (9) is arranged in each stator groove (5) in order to form an electrical stator winding (8), wherein each of the stator grooves (5) has a groove base (5.1) facing the stator yoke (7) and a groove slot (5.2) facing away from the groove base (5.1), wherein a plurality of support points (11) distanced from one another in an axial direction with respect to the stator axis (2) are formed in the respective stator grooves (5) in order to support the conductor (9) or conductor bundle (10) lying in the respective stator groove (5), wherein at least one groove gap, which forms a groove gap channel (14) through which a coolant can flow along a cooling path (15), is formed between walls (5.1, 4.2) of each stator groove (5) and the respective conductor (9) or conductor bundle (10), wherein each groove gap channel (14) is at least constricted at the support points (11), wherein the groove slot (5.2) of each stator groove (5) is closed by a groove closure (16), a respective bypass (18) is provided in each stator groove (5) at each of the support points (11) in order to conduct the coolant past the constricted support point (11) in the groove gap channel (14), and the respective bypasses (18) are arranged at the different support points (11) of the same stator groove (5) at different radial positions such that a meandering cooling path (15) is formed in the stator groove (5), wherein the bypasses (18) of the different support points (11) of the same stator groove (5) are each formed either at the groove base (5.1) or in the groove closure (16) such that a meandering cooling path (15) is formed in the stator groove (5), wherein laminations of the plurality of laminates (6) disposed between the plurality of support points (11) in the axial direction do not contact the conductor (9) or the conductor bundle (10).

2. The stator according to claim 1 wherein the bypasses (18) of the different support points (11) of the same stator groove (5) are formed alternatingly at the groove base (5.1) or in the groove closure (16) in order to form the meandering cooling path (15) from one support point (11) to the next support point (11).

3. The stator according to claim 2, wherein the bypasses (18) of the different support points (11) of the same stator groove (5) formed alternatingly at the groove base (5.1) are in the groove base (5.1) or in the tooth flanks (4.2) at the groove base (5.1).

4. The stator according to claim 1, wherein each bypass (18) is formed by a bypass channel, wherein the bypass channel has a channel width (b) that is smaller than a conductor width (B) of the conductor (9) or conductor bundle (10).

5. The stator according to claim 4, wherein the laminated core (3) comprises a plurality of identical laminates (6), wherein each individual laminate of the identical laminates (6) comprises a plurality of groove recesses (20) for forming the stator grooves (5), wherein, relative to any of the individual laminates (6), a bypass recess (19) is provided at the groove base (5.1) of selected groove recesses (20) distributed along a periphery according to a selected pattern, the bypass recesses forming the bypass channel.

6. The stator according to claim 5, wherein, in the laminated core (3), a plurality of the identical laminates (6) are rotated about the stator axis (2) such that the bypasses (18) are formed in the individual stator grooves (5) at a selected axial position and over a selected length.

7. The stator according to claim 1, wherein the groove closures (16) of the stator grooves (5) are each formed by a single groove closure element, or are formed integrally, or as a plurality of pieces on a slotted tube.

8. The stator according to claim 1, wherein the support points (11) are formed by rotating at least two laminates (6) of the laminated core (3) about the stator axis (2) by a selected angular rotation (Φ).

9. The stator according to claim 8, wherein, by rotating the laminates (6) of the laminated core (3) in order to form the respective support point (11), support sections (6.1) of the laminates (6) are formed which project into the respective stator groove (5) from opposite sides of the stator groove (5) so as to hold the conductor (9) or conductor bundle (10) between the support sections (6.1) at holding surfaces (13) of the conductor (9) or conductor bundle (10).

10. An electric machine having a housing (24) in which a stator (1) according to claim 1 is arranged, wherein the stator winding (8) forms a winding head (8.1) on each end face of the stator (1), wherein a winding head cooling chamber (25) which accommodates the respective winding head (8.1) is provided inside the housing (24) on each end face of the stator (1) for cooling the respective winding head (8.1), wherein flow is thereby achievable through the stator grooves (5) from one of the two winding head cooling chambers (25) through the cooling path (15) of the stator grooves (5) to the other winding head cooling chamber (25).

11. The stator according to claim 1, wherein the conductor bundle (10) includes a stack of flat wire conductors.

12. The stator according to claim 1, wherein the coolant is oil.

13. The stator according to claim 1, wherein the bypasses (18) of the different support points (11) of the same stator groove (5) formed at the groove base (5.1) are in the groove base (5.1) or in the tooth flanks (4.2) at the groove base (5.1).

\* \* \* \* \*